Dec. 31, 1935.  J. HROMEK  2,026,472
CLAMP AND SPREADER FOR CONCRETE FORMS
Filed July 2, 1934
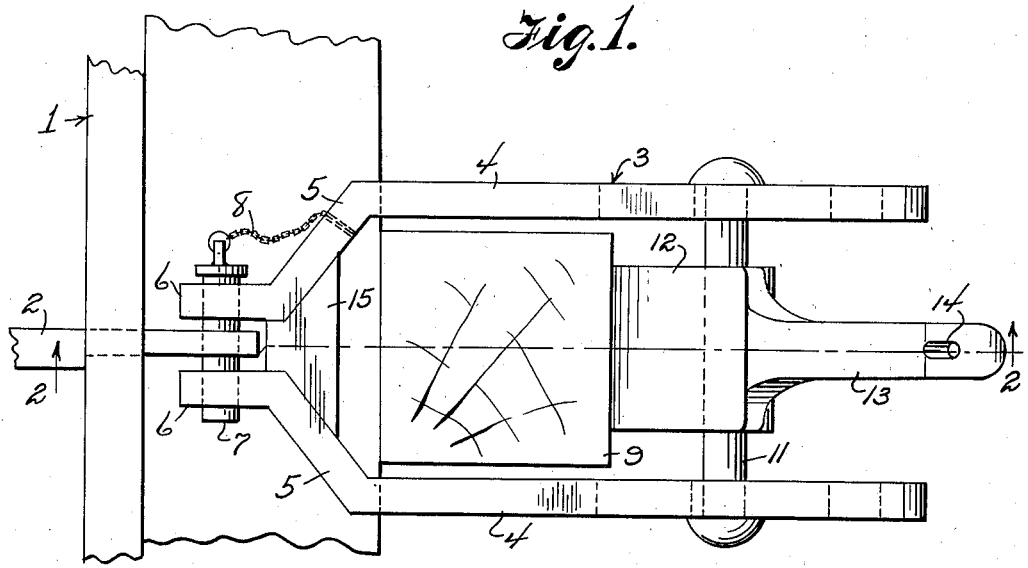
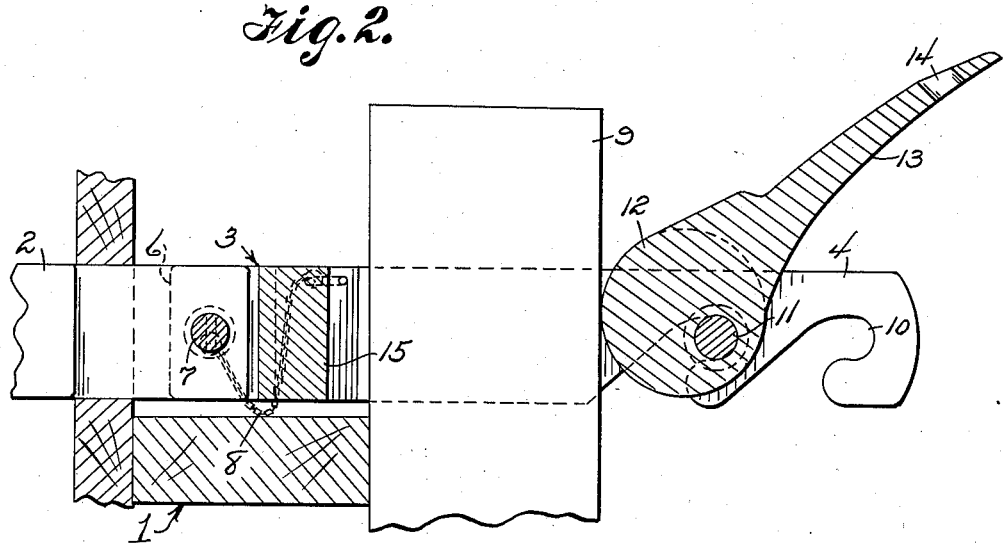
John Hromek
INVENTOR
BY Victor J. Evans & Co.
ATTORNEY Patented Dec. 31, 1935

2,026,472

UNITED STATES PATENT OFFICE 2,026,472

CLAMP AND SPREADER FOR CONCRETE FORMS

John Hromek, Milwaukee, Wis.

Application July 2, 1934, Serial No. 733,490

1 Claim. (Cl. 25—131)

This invention relates to clamps for connecting spreaders to concrete forms and has for the primary object the provision of a device of the above stated character which will permit a form to be easily and quickly assembled and disassembled and obviates nailing, boring of holes and the employment of screws and like fasteners frequently employed in mold forms of the conventional construction.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a fragmentary sectional view showing a clamp applied to a spreader and mold form and constructed in accordance with my invention.

Figure 2 is a sectional view taken on the line 2—2 of Figure 1.

Referring in detail to the drawing, the numeral 1 indicates a fragmentary portion of a mold form and 2 a spreader employed for maintaining the walls of the form in proper spaced relation when its ends are anchored to the usual studs or braces of the form. To detachably connect the spreader to the mold form my invention is employed between the mold form and each end of the spreader and is in the form of a clamp 3 consisting of parallel members 4 offset to form converging portions 5 and closely related apertured ears 6 adapted to receive therebetween the apertured end of the spreader and be detachably connected to the latter by a pin 7 connected to the clamp by a chain or flexible element 8. The parallel members 4 straddle a stud or brace 9 of the form and are provided with spaced notches 10. The notches of the members 4 are arranged in alignment and are positioned outwardly of the stud or brace 9. A headed pin 11 is detachably connected to the members 4 by being positioned in either of the pairs of notches and has secured thereto a cam 12 having a handle 13 apertured, as shown at 14. The cam engages the face of the stud or brace 9, as shown in the drawing, and by swinging the handle 13 towards the stud or brace tension may be placed on the spreader.

The parallel members 4 are rigidly connected by a brace 15 and the latter is preferably located between the converging portions 5 of said parallel members so as not to interfere with the application of the clamp to the mold form.

From the foregoing description taken in connection with the accompanying drawing it will be seen that a spreader may be easily and quickly connected to a mold form and placed under a desired tension.

Having described the invention, I claim:

A clamp comprising parallel members having converging portions terminating in closely related apertured ears, a pin received by the apertured ears and extending through the end of a spreader, said parallel members straddling a portion of a mold form and having pairs of notches and the notches of each pair being arranged in opposed relation, a headed pin positioned to engage any of said pairs of notches whereby the pin may be adjusted towards and from said portion of the mold form an eccentric secured to the pin and engageable with said portion of the mold form, and a handle integral with the eccentric.

JOHN HROMEK.